US011503901B2

(12) United States Patent
Baschnagel

(10) Patent No.: US 11,503,901 B2
(45) Date of Patent: Nov. 22, 2022

(54) WATER-PIC TOOTHBRUSH

(71) Applicant: Robert J Baschnagel, Garden City, NY (US)

(72) Inventor: Robert J Baschnagel, Garden City, NY (US)

(73) Assignee: NYCE INNOVATIONS, Canton, MA (US)

(*) Notice: Subject to any disclaimer, the term of this patent is extended or adjusted under 35 U.S.C. 154(b) by 302 days.

(21) Appl. No.: 16/868,454

(22) Filed: May 6, 2020

(65) Prior Publication Data

US 2021/0068527 A1  Mar. 11, 2021

Related U.S. Application Data

(60) Provisional application No. 62/844,236, filed on May 7, 2019.

(51) Int. Cl.
*A47L 9/04* (2006.01)
*A46B 11/00* (2006.01)
*A46B 9/04* (2006.01)
*A61C 17/02* (2006.01)

(52) U.S. Cl.
CPC .............. *A46B 11/002* (2013.01); *A46B 9/04* (2013.01); *A46B 11/0062* (2013.01); *A61C 17/0202* (2013.01); *A46B 2200/1066* (2013.01)

(58) Field of Classification Search
CPC ............ A46B 9/04; A46B 13/02; A46B 11/06
See application file for complete search history.

(56) References Cited

U.S. PATENT DOCUMENTS

2007/0193597 A1* 8/2007 Hurwitz ............ A46B 11/0041
132/114
2017/0172290 A1* 6/2017 Sampaio .............. A46B 11/002
2018/0250109 A1* 9/2018 Sokol .................... A46B 13/04

OTHER PUBLICATIONS

Ip.com search.*

* cited by examiner

*Primary Examiner* — Michael D Jennings

(57) ABSTRACT

A toothbrush including: a body, the body having a head with bristles; and a manually operated pump formed in the body, the pump having a nozzle for drawing a liquid into the body and expelling the water from the body. The nozzle can be disposed on the head on a surface opposite to a surface on which the bristles are disposed. The pump can further include: a reservoir disposed in the body for containing the liquid, the nozzle being in fluid communication with the reservoir; a shaft movably disposed in the reservoir, the shaft having a first seal substantially disposed at a free end of the shaft; and a second seal disposed in the body for sealingly engaging with an outer surface of the shaft. The first seal can be a piston a grip can be disposed at an other end of the shaft.

7 Claims, 7 Drawing Sheets

WATER-PIC TOOTHBRUSH

CROSS-REFERENCE TO RELATED APPLICATION

This application claims benefit to U.S. Provisional Application No. 62/844,236, filed on May 7, 2019, the entire contents thereof is incorporated herein by reference.

BACKGROUND

1. Field

The present invention relates generally to toothbrushes and more particularly to toothbrushes having a water pic feature.

2. Prior Art

Water pics are known in the art for dislodging debris from and in between teeth. Such water pics operate with the use of electric pumps that pump water or other fluids through a small nozzle at a high pressure. The high pressure water or other fluid is directed at teeth to dislodge debris.

Toothbrushes are also known in the art for brushing front, back and top surfaces of teeth. Toothbrushes generally do a poor job of brushing or otherwise removing debris from between teeth.

SUMMARY

Accordingly, a toothbrush is provided. The toothbrush comprising: a head having bristles at a first end; and a water pic at a second end, the water pic comprising: a shaft extending from the head, the shaft having a first seal substantially disposed at a free end of the shaft; a holding tube movably disposed over the shaft, the holding tube comprising: a second seal at a first end of the holding tube for sealingly engaging with an outer surface of the shaft; and an inner cavity for holding a fluid, the inner cavity having a surface upon which the first seal sealingly engages; and a nozzle disposed at an other end of the holding tube for discharging the fluid.

The nozzle can be removably disposed on the other end of the holding tube.

The first seal can be a piston.

Also provided is a toothbrush comprising: a body, the body having a head with bristles; and a manually operated pump formed in the body, the pump having a nozzle for drawing a liquid into the body and expelling the water from the body.

The nozzle can be disposed on the head on a surface opposite to a surface on which the bristles are disposed.

The water pic can further comprise: a reservoir disposed in the body for containing the liquid, the nozzle being in fluid communication with the reservoir; a shaft movably disposed in the reservoir, the shaft having a first seal substantially disposed at a free end of the shaft; and a second seal disposed in the body for sealingly engaging with an outer surface of the shaft.

The first seal can be a piston.

The toothbrush can further comprise a grip disposed at an other end of the shaft.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION

Figure 1:
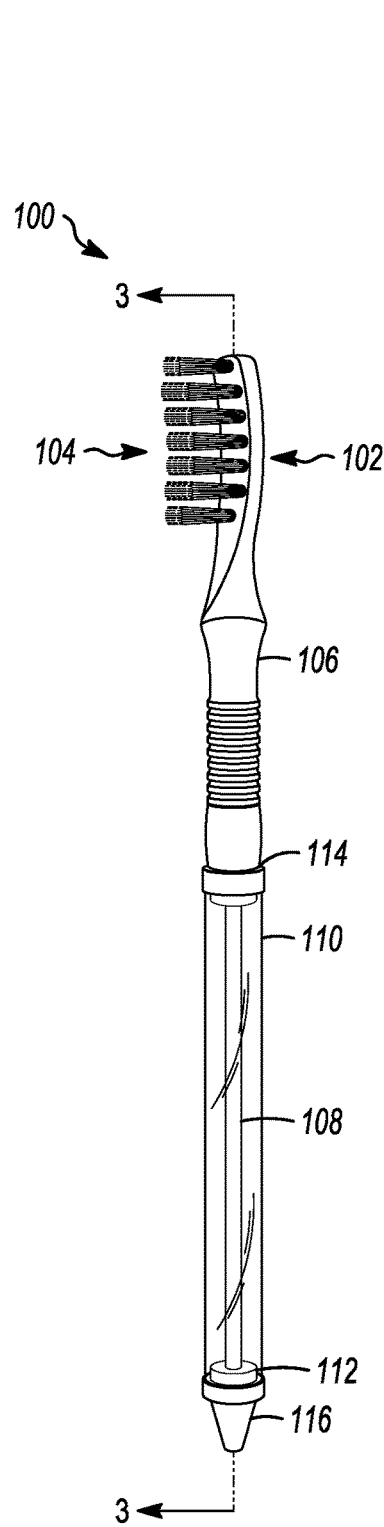
FIG. 1 illustrates an embodiment of water-pic toothbrush with a plunger in a compressed state.

FIGS. 1-4 illustrate an embodiment of a toothbrush 100 having a manually operated pump to provide a water pic function. Such pump having the water pic function is manually operated without the need for electric power and without the need for an electric pump. As shown in FIG. 1, the toothbrush 100 has a conventional head 102 having an array of bristles 104. The head and bristles are formed of materials know in the art, such as plastics.

Figure 4A:
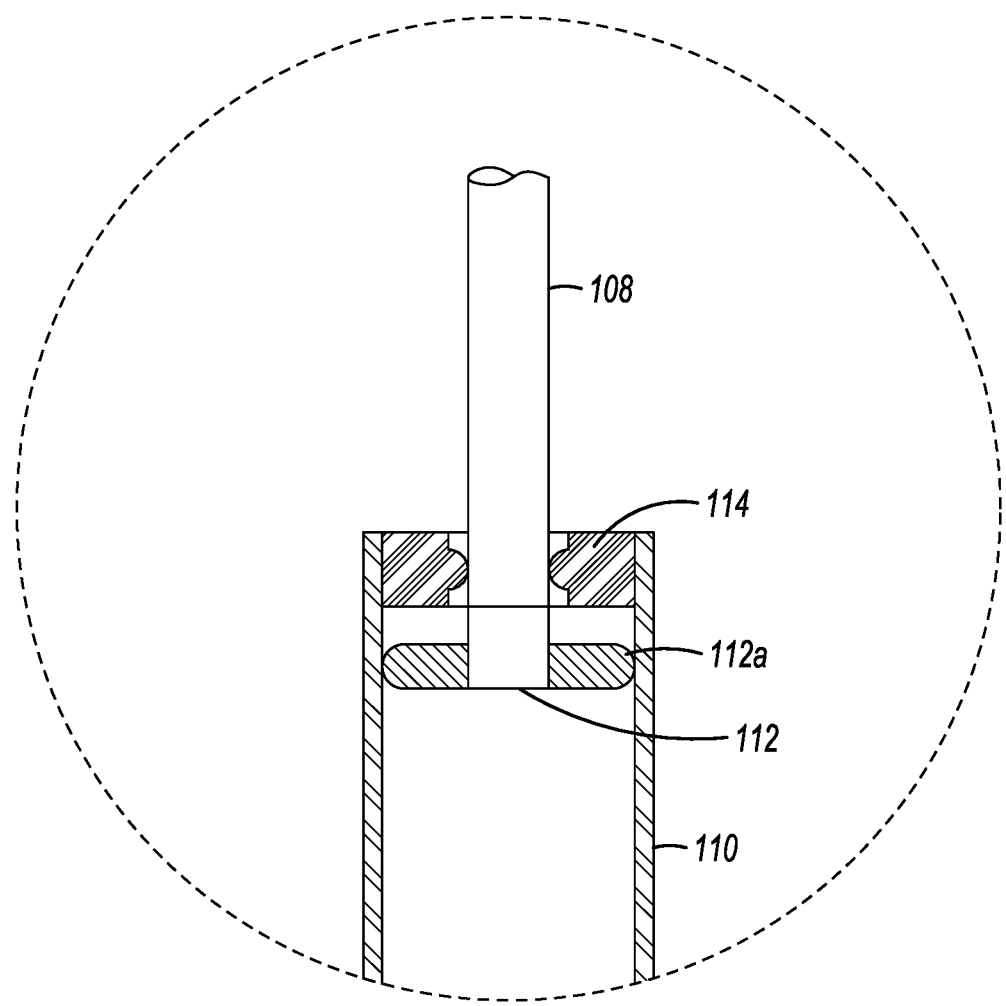
FIG. 4a illustrates an enlarged detail view of the seals of the water-pic toothbrush of FIG. 4.

The toothbrush head 102 extends longitudinally to a neck 106. The neck can also be formed of materials known in the art, such as plastics. The shaft 108 can be formed integrally with the neck or separately therefrom and fixed to the neck 106, such as by press fitting, threading or adhering a portion of the shaft into a corresponding blind hole or mating thread in the neck 106. The neck 106 further extends longitudinally with a shaft 108 which is exposed when a holding tube 110 is moved longitudinally away from the head 104. A free end of the shaft includes a plunger or piston 112 closely fitted with an inner diameter of the holding tube 110. As shown in FIG. 4a, the plunger or piston 112 can have a seal 112a formed on a surface thereof which seals against an inner surface of the holding tube 110. The sealing surface can be integrally formed with the plunger or piston or separately formed, such as an o-ring disposed in a corresponding o-ring groove on the piston or plunger. The head 102, neck 106, shaft 108 and tube 110 forming a body and at least parts thereof configuring the pump.

Figure 2:
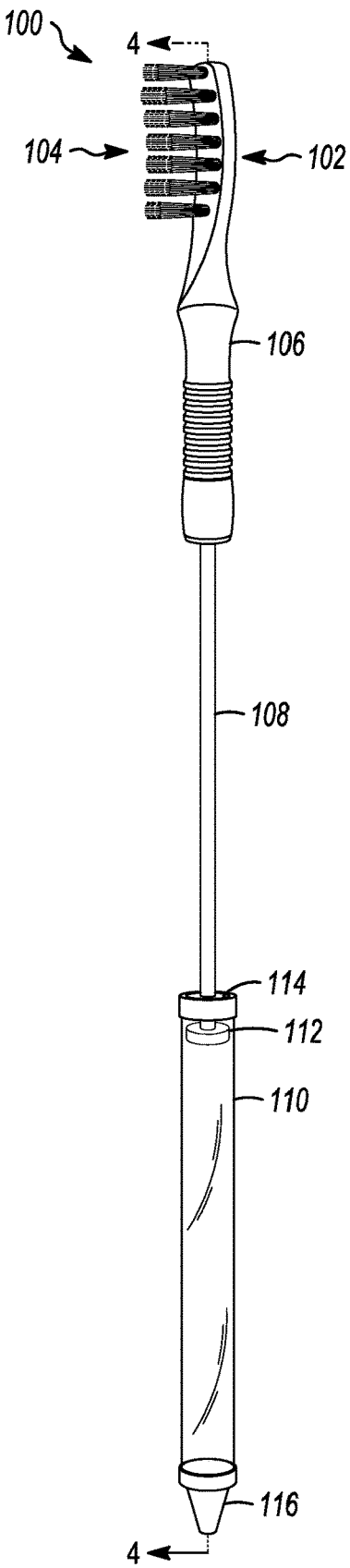
FIG. 2 illustrates the water-pic toothbrush of FIG. 1 with the plunger in an extended state.
Figures 3, 4:
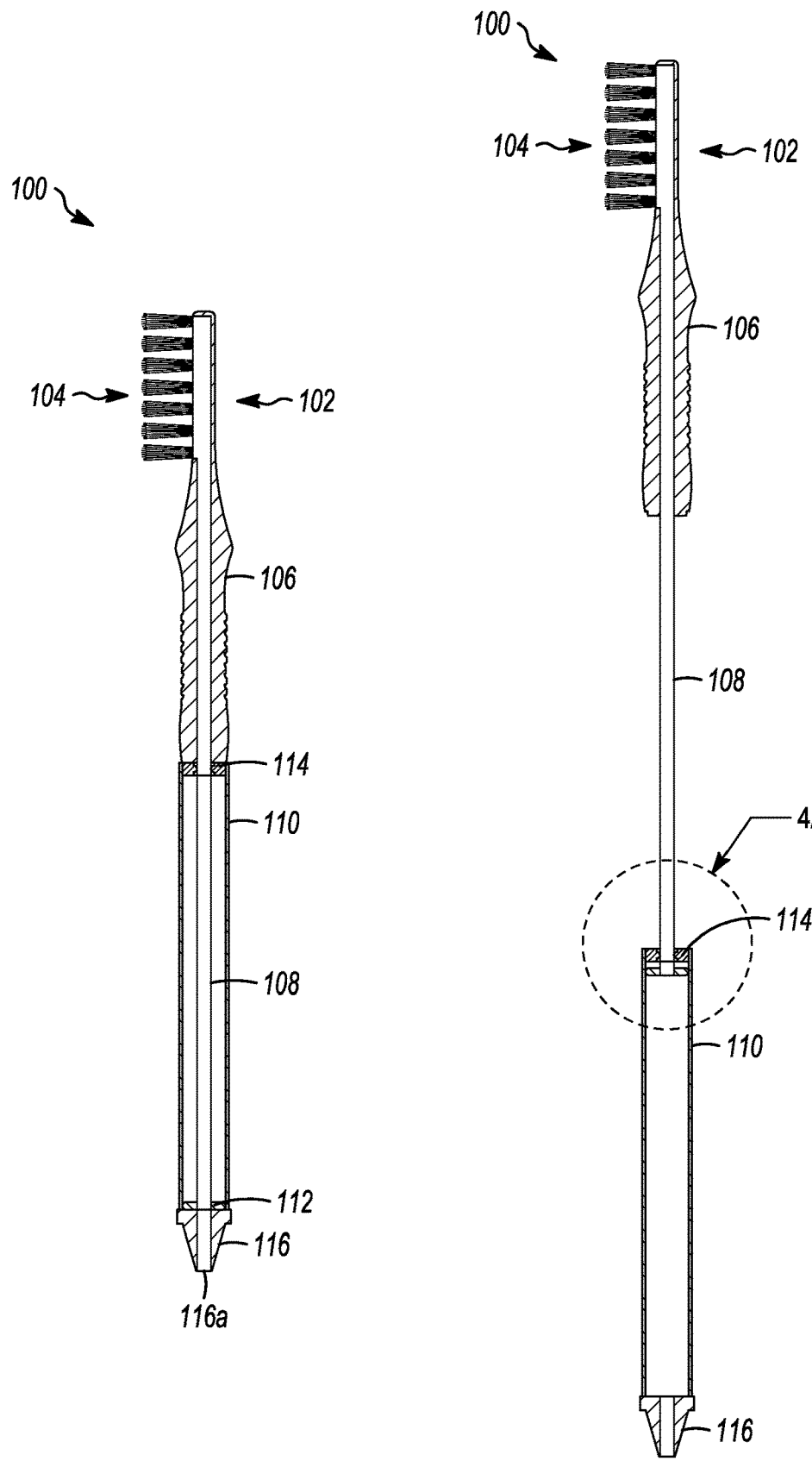
FIG. 3 illustrates a sectional of the water-pic toothbrush of FIG. 1 with a plunger in a compressed state as taken along section 3-3.
FIG. 4 illustrates a sectional of the water-pic toothbrush of FIG. 2 with the plunger in an extended state as taken along section 4-4.

As also shown in FIG. 4a, one end of the holding tube 110 includes a seal 114 to watertightly seal around the shaft 108. The seal 114 can be formed integrally with the end of the holding tube 110 or formed separately therefrom, such as in a cap or insert fixed to the one end, such as by mating threads or an adhesive. The seal 114 can alternatively be a diaphragm formed of a thin rubber sheet having a hole smaller than an outside diameter of the shaft 108 or an o-ring type seal fitted into a corresponding o-ring groove at the end of the holding tube 110 or formed in the cap. In FIGS. 1 and 2, the holding tube 110 is shown transparent so that the shaft 108 and seal 112 can be shown theretrough.

Another end of the holding tube 110 includes a nozzle 116 having an opening 116a with a diameter smaller than that of the inner diameter of the holding tube 110. The water tube 110 can be formed of a plastic, which can be transparent or substantially transparent. The nozzle 116 can be integrally formed with the holding tube 110 or separately formed therefrom and fixed to the holding tube 110, such as by press-fit, mating threads or adhesive.

The holding tube 110 is longitudinally movable on the shaft 108 from the compressed position shown in FIG. 1 to the extended position shown in FIG. 2.

To operate the pumping water-pic function of the toothbrush 100, the holding tube 110 is moved to the compressed state shown in FIG. 1 while the nozzle 116 is immersed in a liquid, such as water. While maintaining the nozzle 116 immersed in the liquid, the neck 106 (and head 102) is withdrawn away from the holding tube 110 so as to draw the liquid into the holding tube 110 by suction. The nozzle 116 can then be removed from the liquid and directed at the teeth while the holding tube 110 is drawn back towards the neck 106 such that the plunger 112 forces the liquid in the holding tube 110 to be expelled from the nozzle 116.

The pressure at which the liquid is expelled from the nozzle varies with the force applied to withdraw the holding tube 110 towards the neck 106 and the size of the opening of the nozzle 116. In this regard, the nozzle 116 can be replaceable, such as with a female thread on the nozzle and a mating male thread on the end of the holding tube 110. If replaceable, a seal can also be provided between the nozzle and the holding tube, such as mating tapered surfaces or an elastomer seal. The replaceable nozzles can have varying size openings to provide varying pressures.

As a further alternative, the head 102 and/or bristles 104 can be replaceable from the neck 106 to replace bristles that are worn or to provide different stiffness bristles.

Referring now to FIGS. 5-10, there is shown another embodiment of water-pic toothbrush, generally referred to by reference numeral 200. As discussed above with regard to the embodiment of FIGS. 1-4, the water-pic toothbrush of FIGS. 5-10 also includes a manually operated pump having a water pic function that is manually operated without the need for electric power and without the need for an electric pump. As shown in FIGS. 5-8, the toothbrush 200 has a conventional head 202 having an array of bristles 204. The head and bristles are formed of materials know in the art, such as plastics.

The toothbrush head 202 extends longitudinally to a neck 206 and handle 208. The neck 206 and handle 208 can also be formed of materials known in the art, such as plastics. Together, the head 202, neck 206 and handle 208 form a body 210, which can be integrally formed or formed from parts and attached together, such as by press-fit or adhesive, such as a clam-shell configuration as is known in the art.

Figure 9:
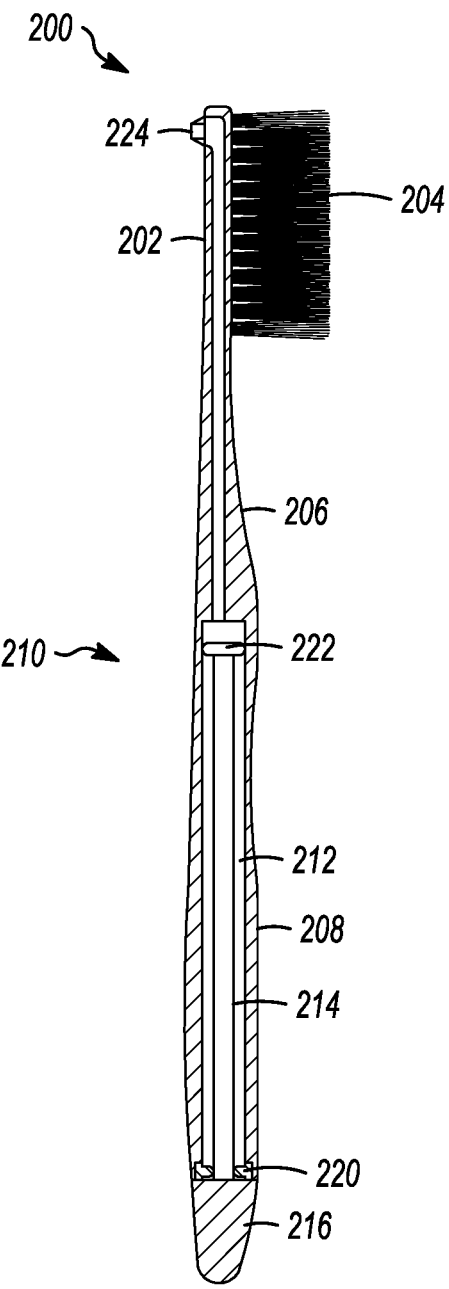
FIGS. 9 and 10 illustrates sectional views of the water-pic toothbrush of FIGS. 5 and 6, respectively, as taken along lines 9-9 and 10-10, respectively.
Figure 10:
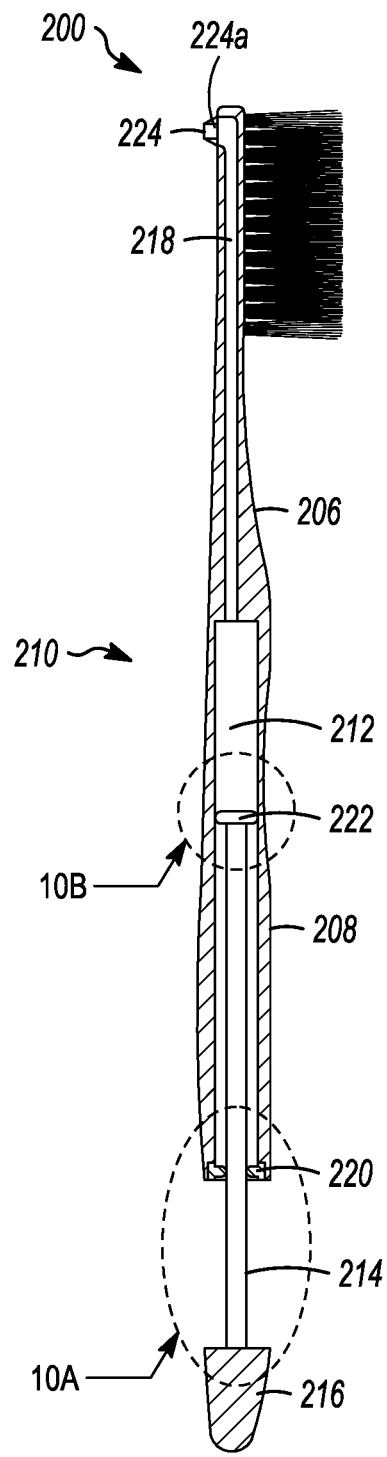

Referring now to FIGS. 9 and 10, the body 210 includes a reservoir 212 formed therein for holding a liquid, such as water. The reservoir 212 can be a portion or a substantial entirety of a longitudinal length and/or lateral width of the body 210.

Referring back to FIGS. 5-8, the water-pic toothbrush 200 further includes a shaft 214 having a grip 216 at an end thereof configured to be gripped by a user for operating the water-pic function of the water-pic toothbrush as described below. The grip 216 can have a shape that substantially matches the contours of the adjacent portions of the handle 208 such that, when the grip 216 abuts the handle 208 (FIGS. 5 and 7), the same fit together and have an appearance of being integrally formed as a single piece.

Figure 10A:
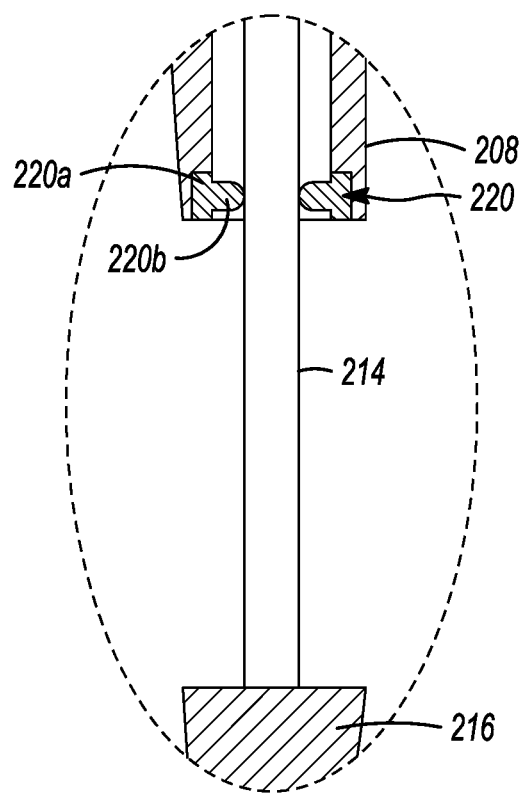
FIGS. 10a and 10b illustrate enlarged detail views of the seals of the water-pic toothbrush of FIG. 10.

As shown in FIG. 10a, one end of the reservoir 212 or a conduit extending from the reservoir 212 includes a seal 220 for watertightly sealing against an outer surface of the shaft 214. The seal 220 can be formed integrally with the handle 208 in the area of the reservoir 212 or conduit or formed separately therefrom, such as an insert 220a having a projecting seal 220b engaging with a surface of the shaft 214 or as an o-ring type seal in a corresponding groove formed in the handle 208.

Figure 10B:
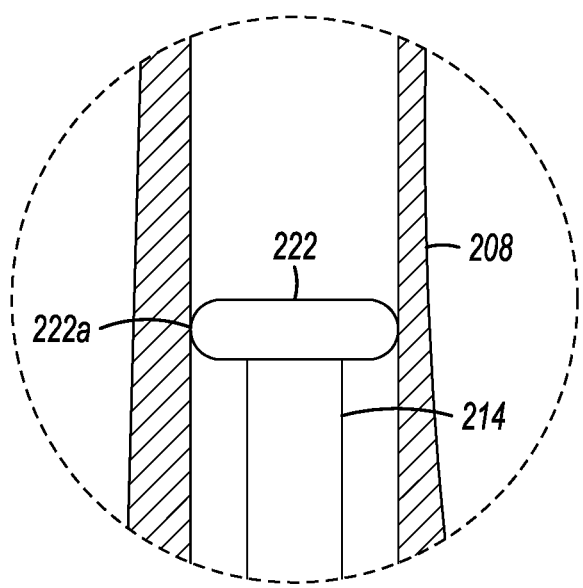

As shown in FIG. 10b, a free end of the shaft 214 includes a plunger or piston 222 having a surface 222a closely fitted with an inner surface of the reservoir 212. The plunger or piston 222 can have the sealing surface 222a formed thereon which seals against an inner surface of the reservoir 212. The sealing surface can be integrally formed with the plunger or piston or separately formed, such as an o-ring disposed in a corresponding o-ring groove on the piston or plunger.

The body 210 includes a nozzle 224, such as on a surface of the head 202 opposing the surface on which the bristles 204 are formed. The nozzle 224 having an opening 224a with a diameter smaller than that of the reservoir 212 or conduit 218 proximate to the nozzle 224. The nozzle 224 can be integrally formed with the body 210 or separately formed therefrom and fixed to the body 210, such as by press-fit, mating threads or adhesive.

For purposes of this disclosure, the reservoir and conduit(s) can be collectively considered to be the reservoir.

The shaft 214 can be formed integrally with the grip 216 or separately therefrom and fixed to the grip 216, such as by press fitting, threading or adhering a portion of the shaft into a corresponding blind hole or mating thread in the grip 216. The shaft 214 is exposed when the grip 216 is moved longitudinally away from the body 210. Thus, the shaft 214 is longitudinally movable within the reservoir 212 from the compressed position shown in FIGS. 5, 7 and 9 to the extended position shown in FIGS. 6, 8 and 10.

Figure 5:
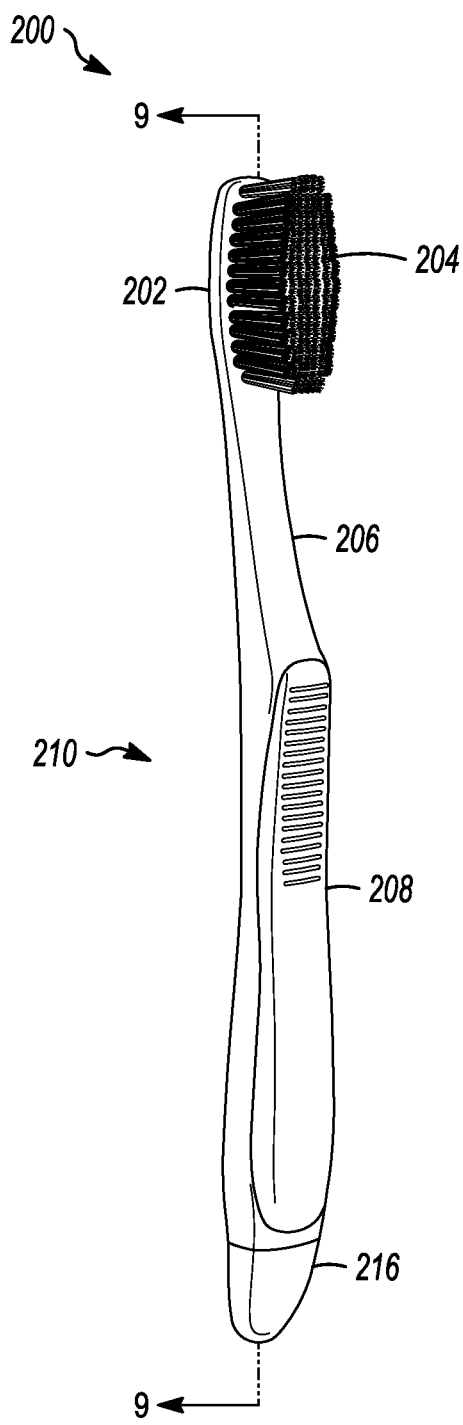
FIGS. 5 and 6 illustrates front views of another embodiment of water-pic toothbrush in compressed and extended states, respectively.
Figure 6:
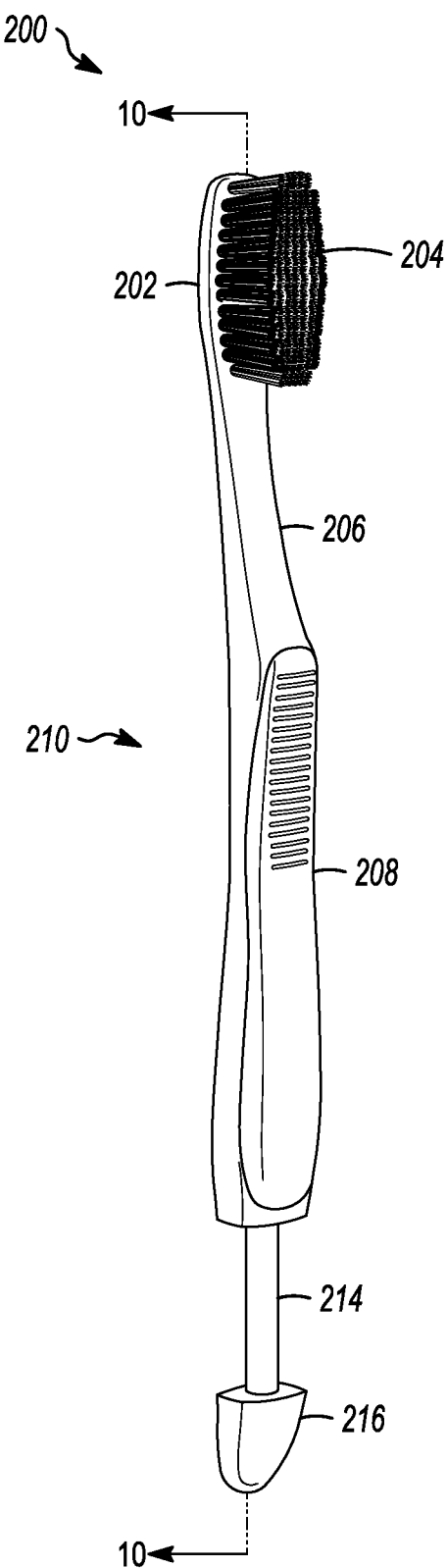
Figure 7:
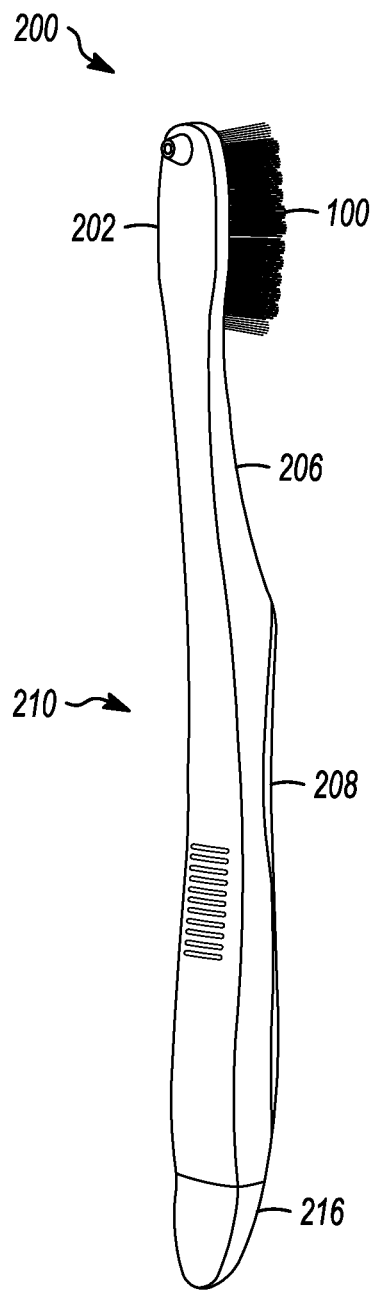
FIGS. 7 and 8 illustrates rear views of the water-pic toothbrush of FIGS. 5 and 6, respectively.
Figure 8:
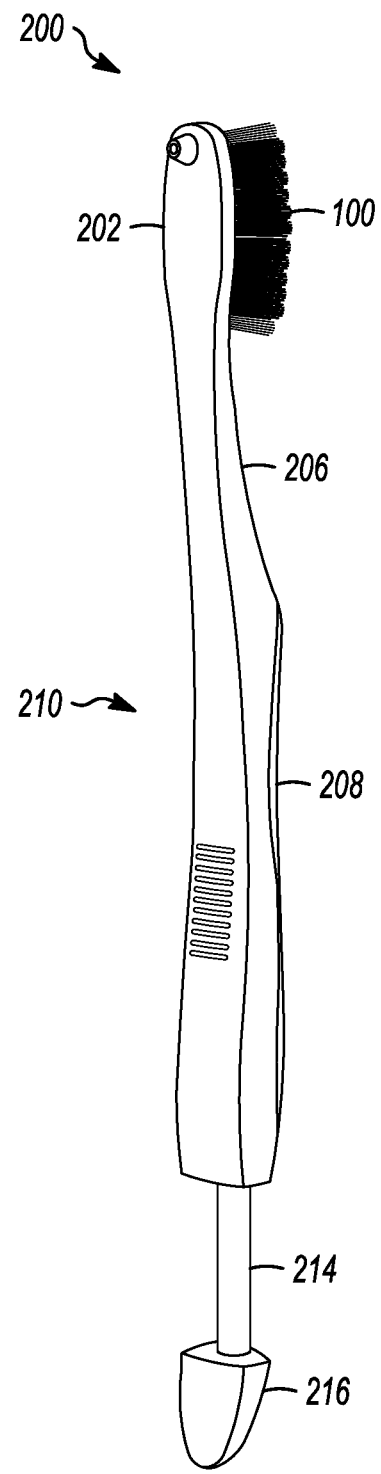

To operate the water-pic function of the water-pic toothbrush 200, the grip 216 is moved to the compressed state shown in FIGS. 5, 7 and 9 while the nozzle 224 is immersed in a liquid, such as water. While maintaining the nozzle 224 immersed in the liquid, the grip 216 is withdrawn away from the body 210 so as to draw the liquid into the reservoir 212 by suction. The nozzle 224 can then be removed from the liquid and directed at the teeth while the grip 216 is drawn back towards the body 210 such that the plunger 222 forces the liquid in the reservoir 212 to be expelled from the nozzle 224.

As discussed above with regard to the embodiment of FIGS. 1-4, the pressure at which the liquid is expelled from the nozzle 224 varies with the force applied to draw the grip 216 towards the body 210 and the size of the opening of the nozzle 224. In this regard, the nozzle 224 can be replaceable, such as with a male thread on the nozzle and a mating female thread in the body 210. The replaceable nozzles can have varying size openings to provide varying pressures.

As an alternative configuration, the water-pic tooth brush 200 can be configured similarly to a "Super-Soaker," as the same is known in the art. In this regard, the reservoir 212 can comprise an expandable bladder having an interior in fluid communication with the nozzle 224. A valve is closed allowing the fluid to be drawn into the bladder with several in and out strokes of the piston 222 to build up additional pressure in the bladder. At such time, the valve, such as a push-bottom switch held by the body 210 and positioned in the conduit 218, can be moved to an open position allowing the pressurized fluid in the bladder to flow through the conduit 218 and from the nozzle 224 at an increased pressure. In this regard, the stroke of the piston 222 can be made to be smaller such that several strokes are necessary to fully pressurize the bladder.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A toothbrush comprising:
    a head having bristles at a first end; and
    a water pic at a second end, the water pic comprising:
        a shaft extending from the head, the shaft having a first seal substantially disposed at a free end of the shaft;
        a holding tube movably disposed over the shaft, the holding tube comprising:
            a second seal at a first end of the holding tube for sealingly engaging with an outer surface of the shaft; and
            an inner cavity for holding a fluid, the inner cavity having a surface upon which the first seal sealingly engages; and
        a nozzle disposed at an other end of the holding tube for discharging the fluid.

2. The toothbrush of claim 1, wherein the nozzle is removably disposed on the other end of the holding tube.

3. The toothbrush of claim 1, wherein the first seal is a piston.

4. The toothbrush of claim 1, wherein the first seal is a piston.

5. The toothbrush of claim 1, further comprising a grip disposed at an other end of the shaft.

6. A toothbrush comprising:
    a body, the body having a head with bristles; and
    a manually operated pump formed in the body, the pump having a nozzle for drawing a liquid into the body and expelling the water from the body;
    wherein the pump further comprises:
        a reservoir disposed in the body for containing the liquid, the nozzle being in fluid communication with the reservoir;
        a shaft movably disposed in the reservoir, the shaft having a first seal substantially disposed at a free end of the shaft; and
        a second seal disposed in the body for sealingly engaging with an outer surface of the shaft.

7. The toothbrush of claim 6, wherein the nozzle is disposed on the head on a surface opposite to a surface on which the bristles are disposed.

* * * * *